United States Patent
Mizukami

[11] Patent Number: 5,906,257
[45] Date of Patent: May 25, 1999

[54] CLUTCH COVER ASSEMBLY

[75] Inventor: Hiroshi Mizukami, Neyagawa, Japan

[73] Assignee: Exedy Corporation, Neyagawa, Japan

[21] Appl. No.: 08/870,588

[22] Filed: Jun. 6, 1997

[30] Foreign Application Priority Data

Jun. 13, 1996 [JP] Japan .................................. 8-152484

[51] Int. Cl.$^6$ .................................................. F16D 13/44
[52] U.S. Cl. .................................... 192/89.23; 192/70.27
[58] Field of Search .......................... 192/89.23, 70.27, 192/109 A

[56] References Cited

U.S. PATENT DOCUMENTS

| | | | |
|---|---|---|---|
| 4,602,708 | 7/1986 | Nagano | 192/89.23 X |
| 4,949,829 | 8/1990 | Tojima et al. | |
| 5,088,583 | 2/1992 | Takeuchi et al. | 192/89.23 X |
| 5,301,782 | 4/1994 | De Briel et al. | 192/89.23 |
| 5,593,014 | 1/1997 | Viola et al. | 192/89.23 X |

*Primary Examiner*—Charles A. Marmor
*Assistant Examiner*—Saúl J. Rodríguez
*Attorney, Agent, or Firm*—Shinjyu An Intellectual Property Firm

[57] ABSTRACT

A clutch cover assembly (1) includes a clutch cover (2), a pressure plate (3), a diaphragm spring (4), stud pins (11), a conical spring (5) and a support plate (10). The conical spring (5) is disposed between the diaphragm spring (4) and a support portion (10a) and biases the diaphragm spring (4) away from engagement with the pressure plate (3). The support plate (10) includes the support potion (10a) and a protruding portion (10b) which supports the diaphragm spring (4).

7 Claims, 4 Drawing Sheets

CLUTCH COVER ASSEMBLY

BACKGROUND OF THE INVENTION

1. Field of the Invention

The present invention relates to a clutch cover assembly having a support member which supports a conical spring in engagement with a diaphragm spring.

2. Description of the Related Art

In general, a clutch cover assembly is mounted on a flywheel of an engine and is used to transmit a drive force of an engine to a transmission. Such a clutch cover assembly is mainly composed of a clutch cover fixed to the flywheel, a pressure plate for clamping a frictional member of a clutch disc assembly against the flywheel, and a biasing member for biasing the pressure plate toward the flywheel.

In general, a diaphragm spring is used as the biasing member mentioned above. The diaphragm spring is composed of an annular spring portion and a plurality of lever portions extending radially inwardly from the inner circumferential edge of the annular spring portion. The diaphragm spring biases movement the pressure plate such that the pressure plate is urged into engagement with the flywheel. When the lever portions are pressed, the diaphragm spring is moved to release its biasing force from the pressure plate.

The force required to dis-engage the clutch is generally equal to the force imparted by the diaphragm spring on the pressure plate. Upon release of the biasing force from the pressure plate, the release load required to continue movement of the diaphragm spring increases as the displacement of the diaphragm spring continues in a relationship generally defined as force displacement characteristics of a spring. Each type of spring has its own force displacement characteristics. For diaphragm springs, at a certain critical point (the peak point), the release load decreases gradually, and again gradually increases at another certain critical point. In a clutch cover assembly, it is desirable for the peak point (the maximum load) of a diaphragm spring to be set such that the peak point corresponds to the clutch mechanism being between an initial clutch engagement position (where a clutch disc is new and has a maximum thickness) and a clutch engagement position where a frictional member of the clutch disc assembly is worn. Therefore, when the frictional member is worn, the release load required to disengage the clutch mechanism may increase as the clutch becomes worn.

Recently, a clutch cover assembly has been fitted with a conical spring improves the release load characteristics. Such a conical spring biases the diaphragm spring in a direction away from the pressure plate. In this case, the release load of the diaphragm spring and the release load of the conical spring are combined. Therefore, the combined release load can be optionally altered by selecting a conical spring having a appropriate load characteristics. For example, at the stroke position where the release load of the diaphragm spring is large, by combining the release load of the diaphragm spring with the release load of the conical spring to reduce the composite load, it is possible to obtain flat release load characteristics where the change of load is suppressed. In other words, when the frictional member is worn, the force required to step on the clutch pedal is hardly changed and the operational feeling upon the release operation is therefore enhanced.

In the conventional clutch cover assembly described above, wire rings are used to support the diaphragm spring from the pressure plate side and a separate a support member such as a support plate is used to support the conical spring. Therefore, the structure for improving the release load characteristics is complicated.

SUMMARY OF THE INVENTION

An object of the present invention is to reduce the number of structural components of a clutch cover assembly that augments a required release load by using a conical spring biased against the diaphragm spring.

In accordance with a first aspect of the present invention, a clutch cover assembly is configured for installation on a flywheel of an engine. The clutch cover assembly includes a clutch cover configured for attachment to a flywheel on an engine and a pressure plate disposed within the clutch cover having a friction surface configured to confront the flywheel. The pressure plate also has an annular protrusion which defines a first fulcrum. A support plate is supported within the clutch cover, the support plate being formed with an annular protruding portion which defines a second fulcrum. A diaphragm spring is supported within the clutch cover, the diaphragm spring biasing the pressure plate toward the flywheel, the diaphragm spring being pivotable about the first fulcrum and the second fulcrum. A conical spring has an outer annular portion engaged with the diaphragm spring, the conical spring biasing the diaphragm spring away from the flywheel in opposition to biasing of the diaphragm spring. The conical spring also has an inner radial portion engaged with the support member.

Preferably, the clutch cover includes a plurality of stud pins which extend through a radial inner portion of the clutch cover the diaphragm spring and the support plate. Each of the stud pins has a head which engages a portion of the support plate. The support plate and the diaphragm spring are retained between the radial inner portion and the head.

Preferably, the support plate is formed with three generally concentric annular portions, a first of the annular portions being formed with apertures through which the stud pins extend, a second of the annular portions extending in a generally axial direction from the first of the annular portions toward the pressure plate, and a third of the annular portions extending radially outward from the second annular portion. The third of the annular portions is configured to support the inner radial portion of the conical spring.

Alternately, a radial inner portion of the clutch cover is formed with a plurality of tabs. Each of the tabs has a first portion which extends in an axial direction toward the pressure plate and a second portion which extends radially outward from the first portion of the clutch cover. The pressure plate and the support plate are confined between the radial inner portion of the clutch cover and the second portion of the tabs.

Preferably the diaphragm spring is formed with a plurality of holes, and the tabs extend through the holes of the diaphragm spring.

In the clutch cover assembly, the diaphragm spring biases the pressure plate toward the flywheel, and the conical spring is biased to oppose the biasing of the diaphragm spring. A release load is required to dis-engage the clutch mechanism. The required release load is equal to a combination of the biasing forces of the diaphragm spring and the biasing forces of the conical spring. The forces or release load of the conical spring is opposed to the release load of the diaphragm spring and therefore counteracts the force or biasing of the diaphragm spring. The rigidity of the conical spring is predetermined so that the displacement characteristics of the conical spring (force verses displacement)

combine with the displacement characteristics of the diaphragm spring to counteract the biasing forces of the diaphragm spring in a movement range of the diaphragm spring where the release load (or biasing force) of the diaphragm spring is relatively large. For instance, the displacement characteristics of the conical spring are such that with the clutch mechanism in an engaged state, the force imparted by the conical spring on the diaphragm spring are generally minimal. However, with the clutch mechanism in a dis-engaged state, the force imparted by the conical spring on the diaphragm spring becomes larger. Specifically, the movement of the diaphragm spring and the movement of the conical spring are such that the release load of the combined forces from diaphragm spring and the conical spring almost cancel each out in the clutch dis-engaged state. In particular, in a movement range of the diaphragm spring where the clutch mechanism is in the dis-engaged state the release load required to move the diaphragm spring and the conical spring is less than the force required to move the diaphragm spring alone. Therefore, as the frictional member becomes worn, changes of the force required to move a clutch pedal by an operator are suppressed, and the operational feeling or response experienced during the release operation is therefore enhanced compared to a prior art clutch cover assembly without the conical spring.

The support plate here is provided with the protruding portion which defines the second fulcrum. The support plate supports the diaphragm spring at the second fulcrum. Further, the support plate supports the conical spring. Therefore, only one wire ring is necessary, since the support plate includes the protruding portion which serves as a wire ring.

These and other objects, features, aspects and advantages of the present invention will become more fully apparent from the following detailed description of the present invention when taken in conjunction with the accompanying drawings where like reference numerals denote corresponding parts throughout.

DESCRIPTION OF THE PREFERRED EMBODIMENTS

First Embodiment

Figure 1:
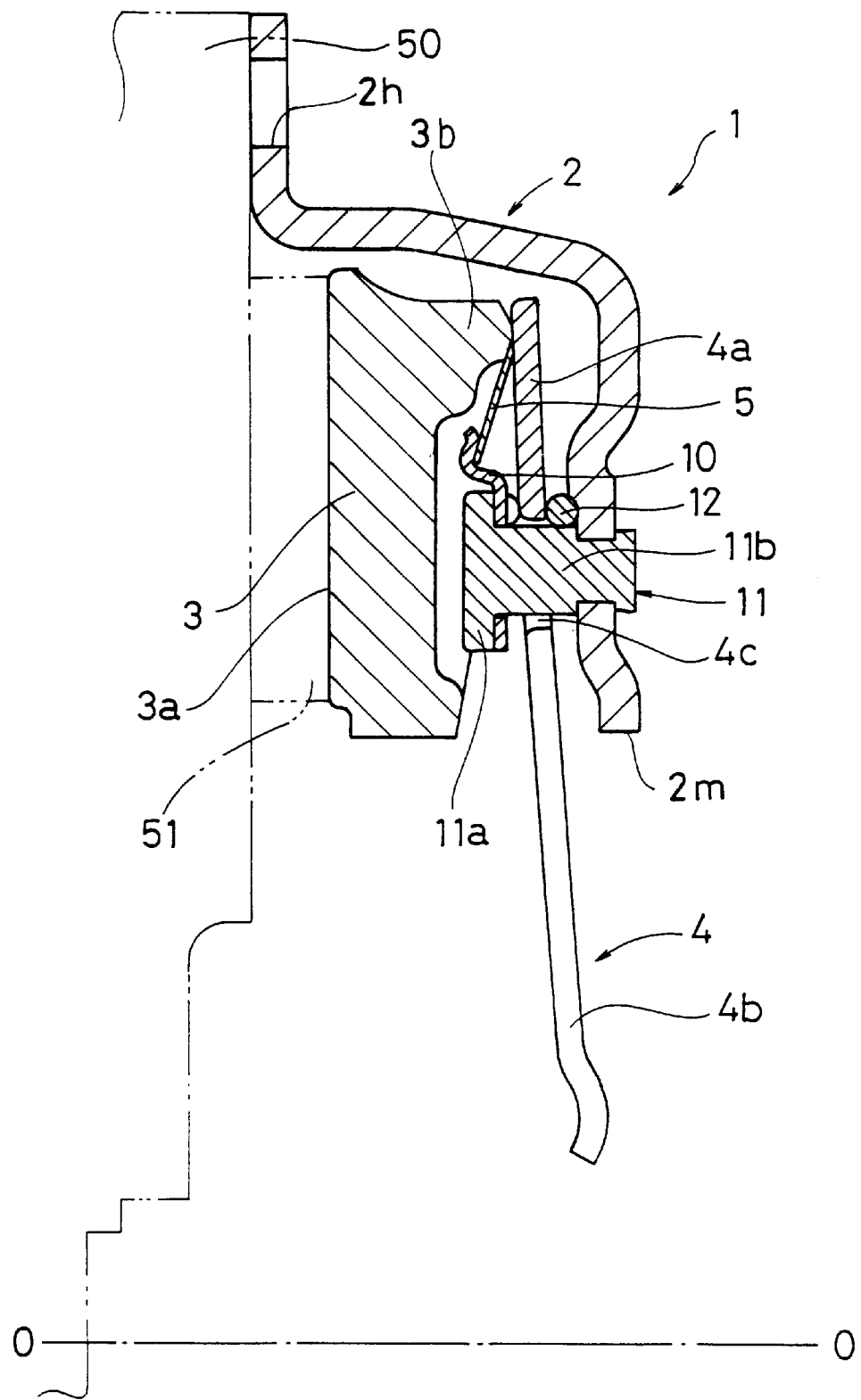
FIG. 1 is a fragmentary, cross-sectional side view of a clutch cover assembly in accordance with a first embodiment of the present invention.

FIG. 1 shows a push-type diaphragm type clutch cover assembly 1 in accordance with the present invention. The push-type diaphragm type clutch cover is a device for selectively engaging and dis-engaging a frictional member 51 of a clutch disc assembly against a flywheel 50. The clutch cover assembly 1 includes a clutch cover 2, a pressure plate 3, a diaphragm spring 4 and a conical spring 5. The line 0—0 in FIG. 1 represents a rotational axis about which the flywheel 50 and the clutch cover assembly 1 rotate. An engine (not shown) is disposed on the left side of FIG. 1 and a transmission (not shown) is disposed on the right side of FIG. 1. Hereinafter, the left side of FIG. 1 will be referred to as the engine side and the right side of FIG. 1 will be referred to as the transmission side.

The clutch cover 2 is a substantially dish-like plate member whose outer circumferential portion is fixed to the flywheel 50 by, for example, bolts which extend through bolt holes 2h. A large diameter hole 2m is formed in the center of the clutch cover 2.

The pressure plate 3 is an annular member and is formed with a pressure surface 3a on a portion thereof, the pressure surface 3a facing the flywheel 50. The frictional member 51 of the clutch disc assembly is disposed between the pressure surface 3a and the flywheel 50. Also, a projecting portion 3b which extends in an axial direction toward the transmission side is formed on a side opposite the pressure surface 3a on the pressure plate 3.

The diaphragm spring 4 is a disc-like member which is disposed between the pressure plate 3 and the clutch cover 2 and composed of an annular spring portion 4a, and a plurality of lever portions 4b extending radially inwardly from the inner circumferential portion of the annular spring portion 4a. The outer circumferential portion of the annular spring portion 4a is in contact with the projecting portion 3b of the pressure plate 3. The inner circumferential portion of the annular spring portion 4a is supported within the clutch cover 2, as is described in greater detail below. In the present invention, the diaphragm spring 4 urges the pressure plate 3 toward the flywheel 50. Slits are formed between the adjacent lever portions 4b of the diaphragm spring 4. Oblong holes 4c are formed at a radially outer end of each of the slits.

Figure 2:
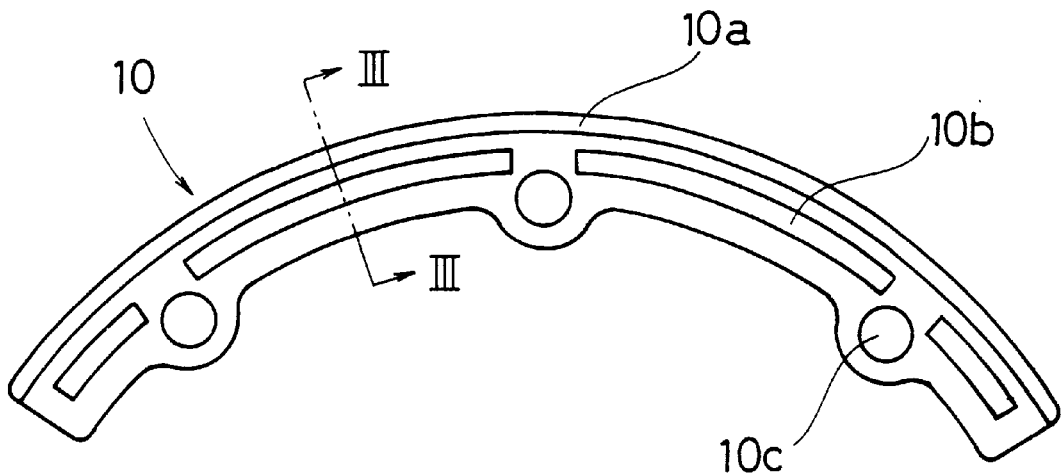
FIG. 2 is an elevational view of a support plate in accordance with the first embodiment of the present invention.

A stud pin 11 includes a pillar portion 11b and a head portion 11a formed at an end portion thereof. The end portion opposite the head portion 11a is fixed to the clutch cover 2. The support plate 10, the diaphragm spring 4 and a wire ring 12 are retained and restrained against axial movement between the head portion 11a and the clutch cover 2. Thus, the diaphragm spring 4 is retained within the clutch cover 2. The pillar portion 11b extends through an aperture 10c formed in the support plate 10, as shown in FIG. 2. The pillar portion 11b also extends through the hole 4c.

The wire ring 12 is an annular member having a round cross section and disposed between the clutch cover 2 and the diaphragm spring 4. The wire ring 12 supports the diaphragm spring 4 on the diaphragm spring's transmission side, between the diaphragm spring and the clutch cover 2. The inner periphery of the wire ring 12 is in contact with the stud pins 11, thereby preventing the radial displacement of the wire ring 12.

The conical spring 5 is a disc-like member disposed between the diaphragm spring 4 and the support plate 10. The inner circumferential portion of the conical spring 5 is supported by a support portion 10a of the support plate 10 (described in greater detail below). The outer circumferential portion of the conical spring 5 is in contact with the outer circumferential portion of the annular spring portion 4a of the diaphragm spring 4. The conical spring 5 biases the outer circumferential portion of the annular spring portion 4a of the diaphragm spring 4 toward the transmission side, away from the flywheel 50.

Figure 3:
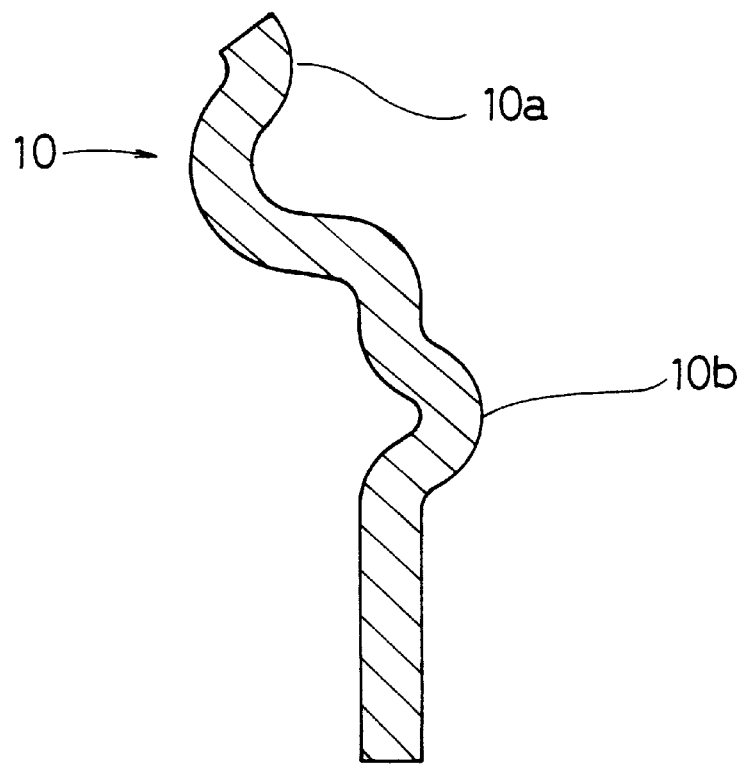
FIG. 3 is a cross-sectional view of the support plate depicted in FIG. 2, taken along the line III—III in FIG. 2.

The support plate 10 is a member formed by deforming an annular disc-like member to generally define three circumferentially extending annular portions. As shown in FIGS. 2 and 3, an outer circumferential portion of the support plate 10 is provided with the support portion 10a and a radial intermediate portion of the support plate 10 is provided with a protruding portion 10b. Also, the apertures 10c are formed in the inner circumferential portion of the support portion 10 at the position corresponding to the holes 4c of the diaphragm spring 4. The support portion 10a supports the inner circumferential portion of the conical spring 5. The protruding portion 10b supports the diaphragm spring 4 from the engine side, proximate the pressure plate 3. The pillar portion 11b of the stud pin 11 extends through the aperture 10c, thereby preventing the radial displacement of the support plate 10.

In the clutch cover assembly 1 in accordance with the present invention, a release mechanism (not shown) is used to engage and disengage the pressure plate 3 from pressing against the friction member 51. When the release mechanism (not shown) engages and pushes against the lever portions 4b, the biasing force of the diaphragm spring 4 is counteracted, the annular spring portion 4a no longer urges the pressure plate 3 into contact with the friction member 51 and the clutch mechanism is disengaged from transmitting torque. When the release mechanism is not applying force to the lever portions 4b of the diaphragm spring 4, the annular spring member 4a applies the pressing load to the pressure plate 3. As a result, the frictional member 51 of the clutch disc assembly is pushed into engagement against the flywheel 50, and torque is transmitted to the clutch disc assembly.

In a clutch dis-engagement state, the release mechanism pushes the tip end of the lever portion 4b of the diaphragm spring 4 toward the flywheel 50, the outer circumferential portion of the annular spring portion 4a of the diaphragm spring 4 is moved toward the clutch cover 2 about the protruding portion 10b of the support plate 10 as a fulcrum. This prevents the annular spring portion 4a from pressing the pressure plate 3, the frictional member 51 is separated from the flywheel 50 to dis-engage the transmission of the torque through the clutch disc assembly 51. The force or release load required for moving the release mechanism toward the flywheel 50 to dis-engage clutch mechanism 1 is generally equal to a combination of forces imparted by the diaphragm spring 4 and of the conical spring 5. Hence, the diaphragm spring 4 has a release load and the conical spring 5 has a release load, which, when combined determine the total release load required to dis-engage the clutch mechanism 1.

The forces or release load of the conical spring 5 is opposed to the release load of the diaphragm spring 4 and therefore counteracts the force or biasing of the diaphragm spring 4. The rigidity of the conical spring 5 is predetermined so that the displacement characteristics of the conical spring 5 (force verses displacement) combine with the displacement characteristics of the diaphragm spring 4 to counteract the biasing forces of the diaphragm spring 4 in a movement range of the diaphragm spring 4 where the release load (or biasing force) of the diaphragm spring 4 is relatively large. For instance, the displacement characteristics of the conical spring 5 are such that with the clutch mechanism in an engaged state, the force imparted by the conical spring 5 on the diaphragm spring 4 are generally minimal, but with the clutch mechanism in a dis-engaged state, the force imparted by the conical spring 5 on the diaphragm spring 4 become larger. Specifically, the movement of the diaphragm spring 4 and the movement of the conical spring 5 are such that the release load of the combined forces from diaphragm spring 4 and the conical spring 5 almost cancel each out in the clutch dis-engaged state. In particular, in a movement range of the diaphragm spring 4 where the clutch mechanism 1 is in the dis-engaged state the release load required to move the diaphragm spring 4 and the conical spring 5 is less than the force required to move the diaphragm spring 4 alone. Therefore, as the frictional member 51 becomes worn, changes of the force required to move a clutch pedal by an operator are suppressed, and the operational feeling or response experienced during the release operation is therefore enhanced compared to a prior art clutch cover assembly without the conical spring 5.

The diaphragm spring 4 pivots about two annular fulcrums when moving between a clutch engagement position and a clutch dis-engagement position. First, the diaphragm spring 4 pivots about a first fulcrum defined by the projecting portion 3b of the pressure plate 3 and a second fulcrum at least partially defined by the protruding portion 10b on the support plate 10. The second fulcrum is also at least partially defined by the wire ring 12.

Moreover, the support plate 10 includes the protruding portion 10b which functions as a wire ring to support the diaphragm spring 4 from the engine side, thereby reducing the number of wire ring by one. As a result, it is possible to reduce the number of components compared to the conventional structure, thereby effecting the weight reduction and cost reduction.

Second Embodiment

Many features and structural aspects described above with respect to the first embodiment are also present in a second embodiment of the present invention. Therefore, generally only those features of the second embodiment which differ from the first embodiment will be described below.

Figure 4:
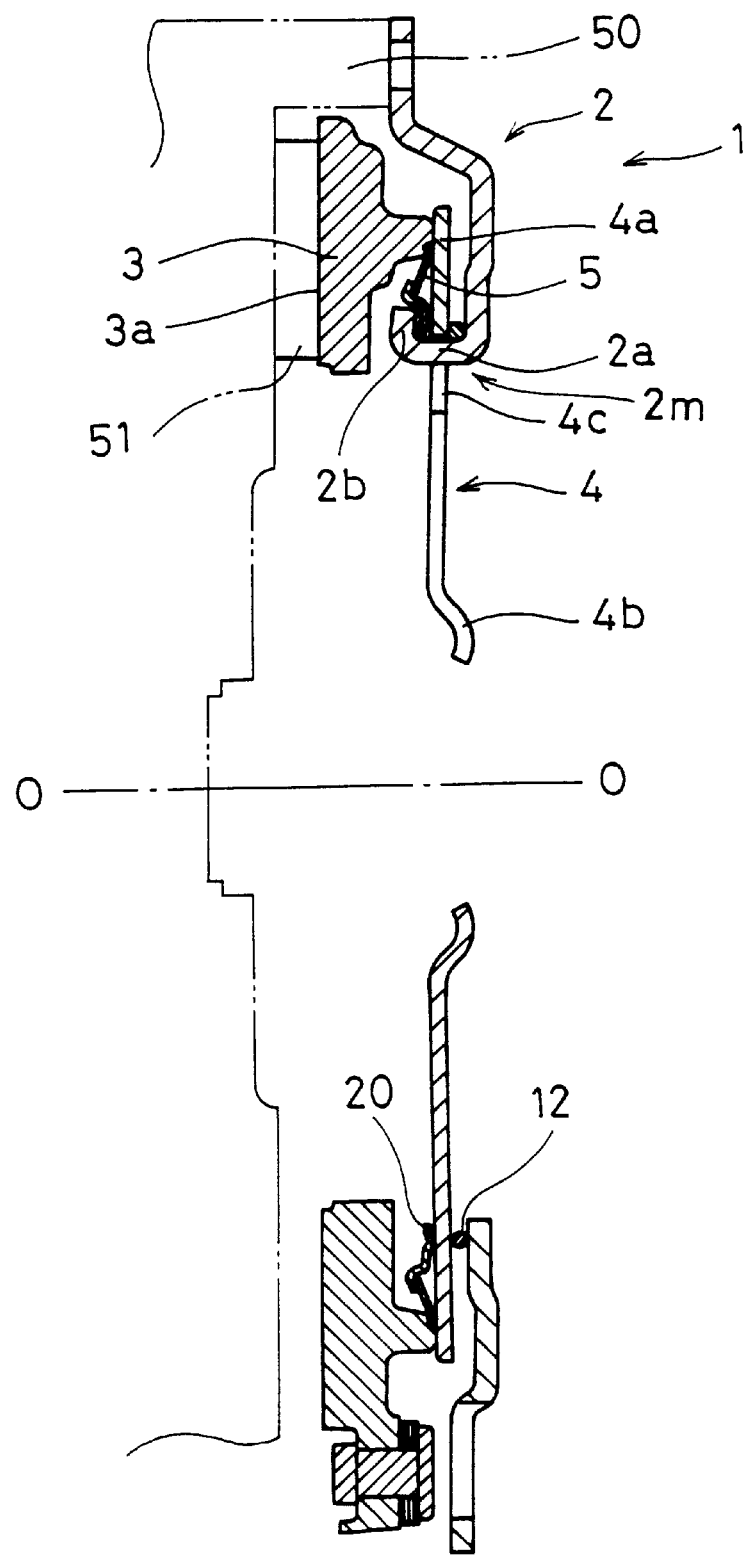
FIG. 4 is a fragmentary, cross-sectional side view of a clutch cover assembly in accordance with a second embodiment of the present invention.

In the first embodiment described above, the diaphragm spring 4 is supported by the conical spring 5 which is in turn supported by the support plate 10. The support plate 10 is in turn supported by the stud pins 11. In a second embodiment of the present invention, the diaphragm spring 4 is instead supported by tabs 2a formed on the radial inner portion of the clutch cover 2. The tabs 2a support a support plate 20 and the support plate 20 in turn supports the conical spring 5, as shown in FIG. 4. No stud pins 11 are necessary.

The plurality of the tabs 2a are formed at the hole 2m by bending an inner circumferential portion of the clutch cover 2. The tabs 2a are bent first to extend toward the flywheel 50 and are bent further to extend radially outward from the hole 2m to form tip ends 2b. The tip end portions 2b of the tabs 2a are bent radially outwardly by press working or a deformation process after installation of the wire ring 12, the diaphragm spring 4, the conical spring 5 and the support plate 20.

Figure 5:
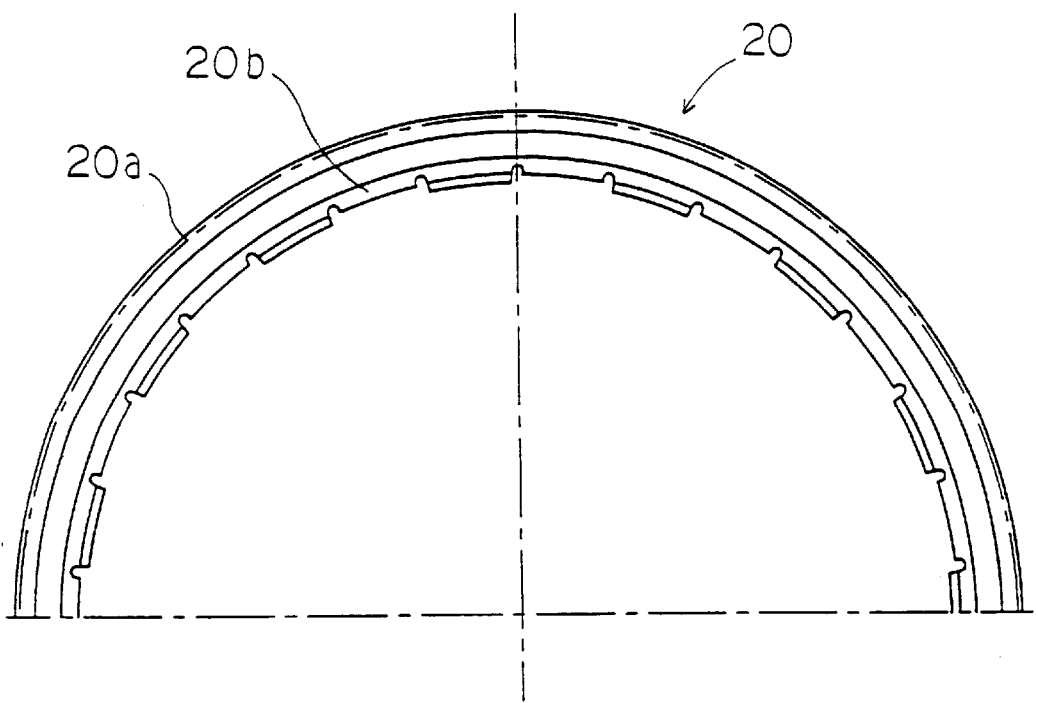
FIG. 5 is an elevational view of a support plate in accordance with the second embodiment of the present invention.
Figure 6A:
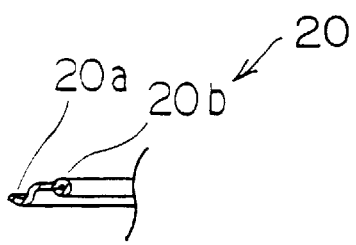
FIGS. 6A and 6B are cross-sectional views of the support plate depicted in FIG. 5, in accordance with a second embodiment of the present invention.
Figure 6B:
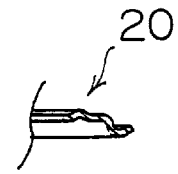

The support plate 20 is a disc-like member shown removed from the clutch cover in FIGS. 5 and 6. The radial outer portion of the support plate 20 is provided with support portions 20a and the radial inner portion of the support plate 20 is provided with projecting portions 2b. The conical spring 5 is retained between the support portion 20a and the diaphragm spring 4. The projecting portions 20b support the diaphragm spring 4 from the engine side. The projecting portions 20b, diaphragm spring 4 and the wire ring 12 are clamped between the tip end portion 2b of the tab 2a and the clutch cover 2. Thus, the diaphragm spring 4 is retained within the clutch cover 2.

In the clutch disc assembly of the type in which the diaphragm spring 4 is supported by the tabs 2a instead of the stud pins 11, the same effects described above with respect to the first embodiment are accomplished. Specifically, the support plate 20 supports both the diaphragm spring 4 and the conical spring 5. As a result, it makes it possible to reduce the number of components compared to prior art structures, thereby effecting the weight reduction and the cost reduction.

Advantages

In the clutch cover assembly in accordance with the present invention, the support plate supports one side of the diaphragm spring. As a result, it is possible to reduce the number of wire rings needed by one and reduce the number of components comparing with the conventional structure.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What we claim is:

1. A clutch cover assembly configured for installation on a flywheel of an engine, comprising:

a dutch cover configured for attachment to a flywheel on an engine;

a pressure plate disposed within said clutch cover having a friction surface configured to confront the flywheel, said pressure plate also having an annular protrusion which defines a first fulcrum;

a support plate supported within said clutch cover, said support plate being formed with an annular protruding portion which defines a second fulcrum;

a diaphragm spring supported within said clutch cover, said diaphragm spring biasing said pressure plate toward the flywheel, said diaphragm spring being pivotable about said first fulcrum and said second fulcrum;

a conical spring having an outer annular portion engaged with said diaphragm spring, said conical spring biasing said diaphragm spring away from said flywheel in opposition to biasing of said diaphragm spring, said conical spring having an inner radial portion engaged with said support member, wherein said support plate is formed from a plate-like material, an outer radial portion of said plate-like material being deformed to form an engagement portion for supporting said inner radial portion of said conical spring, and a radial inner portion of said plate-like material being deformed to form at least one arcuate protrusion, said arcuate protrusion defining said second fulcrum.

2. The clutch cover assembly according to claim 1, wherein said clutch cover includes a plurality of stud pins which extend through a radial inner portion of said clutch cover, said diaphragm spring and said support plate, said stud pins having a head which engages a portion of said support plate, and wherein said support plate and said diaphragm spring are retained between said radial inner portion and said head.

3. The clutch cover assembly according to claim 2, wherein said support plate is formed with three generally concentric annular portions, a first of said annular portions being formed with said arcuate protrusion and with apertures through which said stud pins extend, a second of said annular portions extending in a generally axial direction from said first of said annular portions toward said pressure plate, and a third of said annular portions extending radially outward from said second annular portion, said third of said annular portions defining said engagement portion to support said inner radial portion of said conical spring.

4. The clutch cover assembly according to claim 3, wherein said radial inner portion of said plate-like material is deformed to form a plurality of said arcuate protrusions, said arcuate protrusions being circumferentially spaced apart, said arcuate protrusions defining said second fulcrum.

5. The clutch cover assembly according to claim 1, wherein a radial inner portion of said clutch cover is formed with a plurality of tabs, each of said tabs having a first portion which extends in an axial direction toward said pressure plate and a second portion which extends radially outward from said first portion of said clutch cover, said pressure plate and said support plate being confined between said radial inner portion of said clutch cover and said second portion of said tabs.

6. The clutch cover assembly according to claim 5, wherein said diaphragm spring is formed with a plurality of holes, and said tabs extend through said holes of said diaphragm spring.

7. The clutch cover assembly according to claim 1, further comprising a wire ring disposed between a portion of said diaphragm spring and said clutch cover, said wire ring being axially aligned with said second fulcrum to further define said second fulcrum on a side of said diaphragm spring opposite said arcuate protrusion.

* * * * *